United States Patent [19]

Balius

[11] Patent Number: 4,509,934
[45] Date of Patent: Apr. 9, 1985

[54] EXTERNAL TRANSFER CASE CHAIN SLACK ADJUSTMENT STRUCTURE

[76] Inventor: Donald G. Balius, 1003 Caillavet St., Biloxi, Miss. 39530

[21] Appl. No.: 404,842

[22] Filed: Aug. 3, 1982

[51] Int. Cl.³ .............................................. F16H 7/12
[52] U.S. Cl. .................................................... 474/136
[58] Field of Search ............... 474/101, 111, 136, 137, 474/138, 140

[56] References Cited

U.S. PATENT DOCUMENTS

| | | | |
|---|---|---|---|
| 45,514 | 12/1864 | Nichols | 474/136 |
| 263,399 | 8/1882 | Gardner | 474/136 |
| 516,927 | 3/1894 | Hanson | 474/136 |
| 1,640,623 | 8/1927 | Stein | 474/136 X |
| 2,703,019 | 3/1955 | Burawoy | 474/138 X |
| 3,118,315 | 1/1964 | Loosli | 474/136 X |
| 3,707,092 | 12/1972 | Piech | 474/146 X |
| 3,832,910 | 9/1974 | Bryant | 474/136 |
| 4,411,638 | 10/1983 | Wilson | 474/136 X |

Primary Examiner—James A. Leppink
Assistant Examiner—Frank H. McKenzie, Jr.
Attorney, Agent, or Firm—Harvey B. Jacobson

[57] ABSTRACT

The wall portion of a chain-type 4-wheel drive vehicle transfer case disposed adjacent and generally paralleling the slack reach of the transfer case chain when the associated vehicle is being driven in a forward direction has an opening formed therein registered with the mid-portion of the slack reach and a mounting plate having an opening formed therein is secured in position over the external surfaces of the wall portion with the openings registered with each other. One end of a guide sleeve is secured to the outer surface of the mounting plate in registry with the opening formed therein and an elongated shank member is slidably supported from the sleeve and projects through the registered openings with one end of the shank member projecting into the sleeve and the other end of the shank member projecting into the transfer case. The sleeve is provided with structure engaged with the shank member adjustably limiting movement of the shank member outwardly through the openings and the other end of the shank member disposed within the case journals a roller therefrom for rotation about an axis transverse to the shank member. The roller inwardly deflects and is rollingly engaged with the slack reach of the chain in order to limit the slack thereof.

1 Claim, 4 Drawing Figures

EXTERNAL TRANSFER CASE CHAIN SLACK ADJUSTMENT STRUCTURE

BACKGROUND OF THE INVENTION 4-wheel drive vehicles, for the most part, are provided with transfer cases for driving the front wheels of the vehicles and many of these transfer cases include parallel shafts having aligned sprocket wheels thereon drivingly connected by a chain trained about the sprocket wheels. Further, most of these chain-equipped transfer cases do not include adjustment structure whereby the slack of the transfer case chain may be adjusted and, accordingly, after an extended period of use of the vehicle the transfer case chain incurs wear to the extent that excessive slack is present. Therefore, a need exists for means by which a chain-equipped transfer case may be modified in order to incorporate a transfer case chain slack adjustment mechanism.

Chain and belt slack and tension adjusting structures including some of the general structural and operational features of the instant invention are disclosed in U.S. Pat. Nos. 263,399, 516,927, 1,464,411, 1,640,623, 2,703,019, 3,118,315 and 3,707,092.

BRIEF DESCRIPTION OF THE INVENTION

The transfer case chain slack adjustment structure of the instant invention has been specifically designed for use in conjunction with chain-type transfer cases and particularly those which are utilized on 4-wheel drive vehicles wherein after an indetermined period of use the transfer case chains become overly slack requiring dismantling of the transfer case and replacement of not only the chain but also the sprocket wheels about which the chain is trained. The dismantling of a transfer case and the replacement of the sprocket wheels and chain thereof involves considerable labor and parts expense. However, the chain slack or tensioning adjustment structure of the instant invention may be added to an existing transfer case with minimum labor cost and a parts cost which is considerably less than the cost of a replacement chain and a corresponding set of sprocket wheels. Further, after a transfer case has had the tension adjustment structure of the instant invention mounted thereon, additional adjustments in chain tension may be readily effected in less than one minute.

The main object of this invention is to provide a chain tension adjustment structure which may be mounted on existing 4-wheel drive transfer cases in order to enable the slack of worn transfer chains to be reduced as desired.

Another object of this invention is to provide a tension adjustment structure which may be readily incorporated in new transfer cases and utilized to adjust transfer case chain slack whenever chain and sprocket wheel wear occurs to the extent that excessive slack is present in the chain.

A still further object of this invention is to provide a transfer case chain slack adjustment structure which may be mounted on existing transfer cases with the expenditure of a minimum amount of labor.

A final object of this invention to be specifically enumerated herein is to provide a transfer case chain slack adjustment structure in accordance with the preceding objects and will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
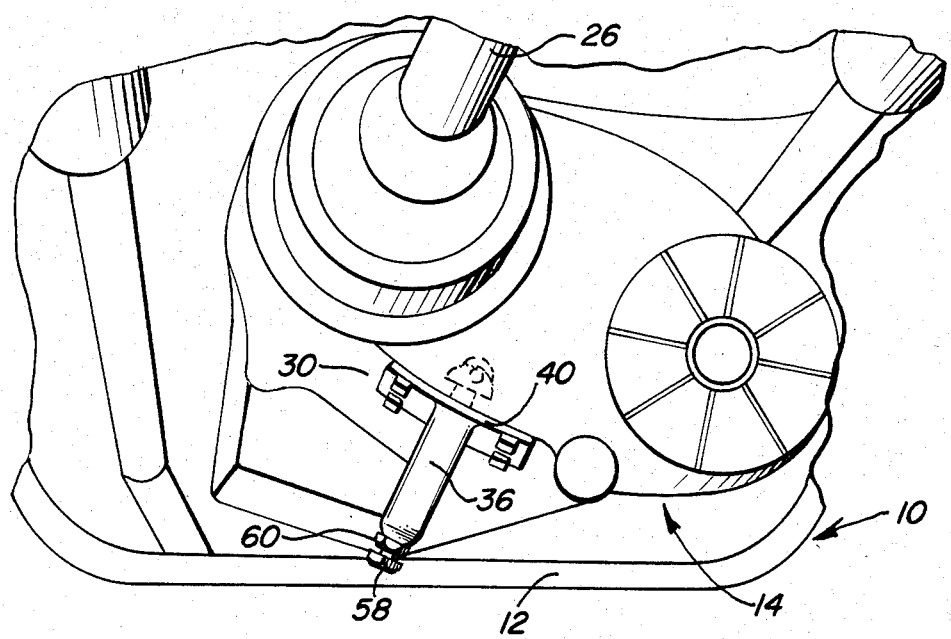
FIG. 1 is a fragmentary perspective view of a typical chain-driven transfer case of a 4-wheel drive vehicle with the chain tension or slack adjustment structure of the instant invention operatively associated therewith.
Figure 2:
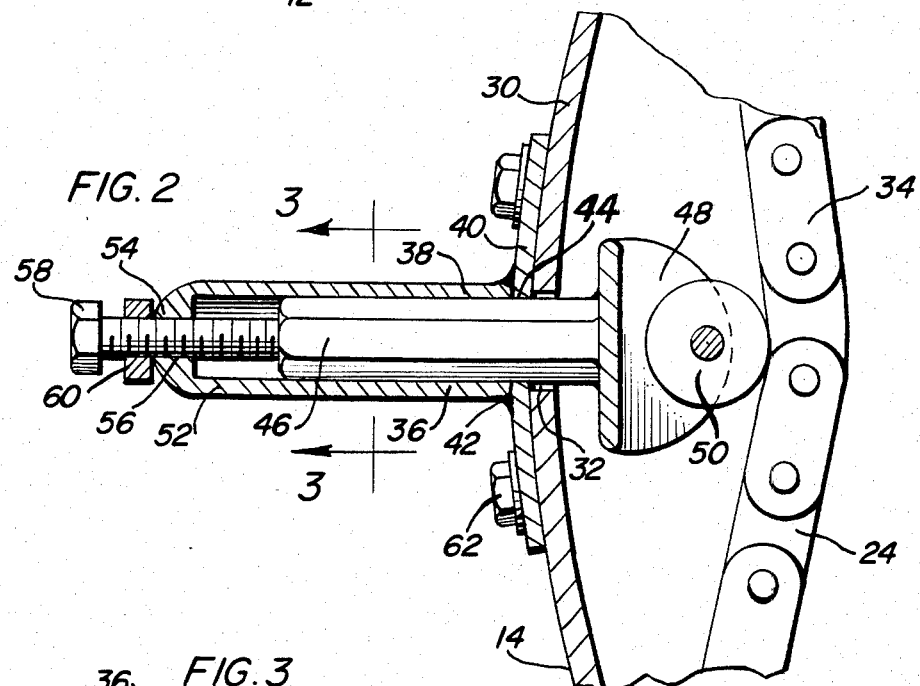
FIG. 2 is an enlarged fragmentary vertical sectional view of that portion of the transfer case upon which the chain tension adjustment structure is mounted and taken substantially upon a plane passing centrally longitudinally through the adjustment structure.
Figure 3:
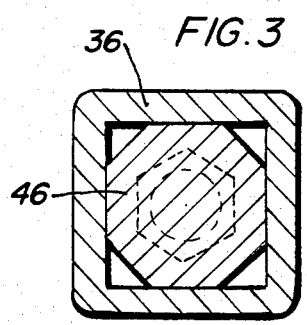
FIG. 3 is an enlarged transverse sectional view taken substantially upon the plane indicated by the section line 3—3 of FIG. 2.

Referring now more specifically to the drawings, the numeral 10 generally designates a 4-wheel drive vehicle which is fragmentarily illustrated in FIG. 1 and seen from beneath the longitudinal midportion thereof and the vehicle 10 includes a frame transverse member 12 from which a conventional transfer case generally referred to by the reference numeral 14 is supported via the transmission (not shown) disposed forward of the transfer case 14.

Figure 4:
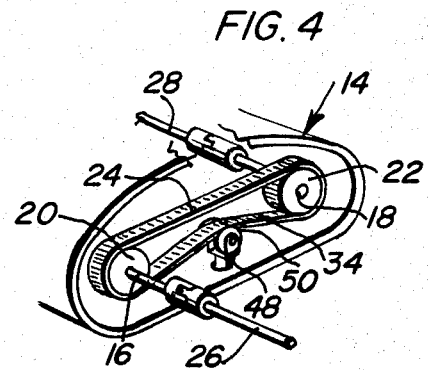
FIG. 4 is a schematic view illustrating the internal components of the transfer case.

The transfer case rotatably journals opposite side shafts 16 and 18 upon which sprocket wheels 20 and 22 are mounted and a chain 24 is trained about the sprocket wheels 20 and 22. The forward end of the shaft 16 is driven from the transmission (not shown) of the vehicle 10 and the rear end of the shaft 16 has the front end of a rearwardly projecting drive shaft 26 operably coupled thereto, the drive shaft 26 extending to the differential (not shown) for the rear wheels of the vehicle 10. Further, the forward end of the shaft 18 is drivingly coupled to the rear end of a forwardly projecting drive shaft 28 which extends forward to the front differential (not shown) for driving the front wheels of the vehicle 10. The lower reach of the chain 24 illustrated in FIG. 4 comprises the slack reach thereof when the vehicle 10 is being driven in a forward direction. Accordingly, the lower wall portion 30 of the transfer case 14 has an opening 32 formed therein in registry with the longitudinal midportion of the lower reach 34 of the chain 24. A mounting sleeve 36 is provided and includes one open end 38 over which a mounting plate 40 is secured by welding 42, the mounting plate 40 having an opening 44 formed therein in registry with the opening 32. An elongated shaft member 46 is provided and projects through the openings 44 and 32 and has a bifurcated mount 48 mounted on the end thereof disposed inwardly of the wall portion 30. The bifurcated mount 48 rotatably journals a roller 50 for rotation about an axis extending transversely of the shank member 46 and generally paralleling the shafts 16 and 18. The shank member 46 is octogonal in cross section and the sleeve 36 is square cross section, whereby the shank member 46 is guided against angular displacement about its longitudinal axis relative to the sleeve 36. Of course, the shank member 46 may also be square in cross section.

The other outer end 52 of the sleeve 36 is closed by an end wall 54 having a threaded bore 56 formed therethrough and a bolt 58 is threaded through the bore 50 and includes an inner end which abuts the opposing outer end of the shank member 46 and thus adjustably limits outward displacement of the shank member 46 in the sleeve 36. The bolt 58 may be provided with a lock nut 60.

The roller 50 rollingly engages and inwardly deflects the slack reach 34 of the chain 24 and thereby reduces the slack. As additional wear of the chain 24 and the sprocket wheels 20, 22 occurs, the lock nut 60 may be loosened, the bolt 58 may be threaded slightly further inwardly of the end wall 54 and the lock nut 60 may again then be tightened. In this manner, excess slack in the slack reach 34 of the chain 24 may be compensated for.

When installing the mounting plate 40, the opening 32 is initially formed in the wall portion 30 and four bores are also formed in the wall portion 30 about the opening 32. These bores may be threaded so as to receive mounting bolts 62, or the bores may be smooth and the mounting bolts 62 may be provided with lock nuts on the inner ends thereof.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle of the type provided with a driving transfer case including a pair of generally parallel shafts having aligned sprocket wheels mounted thereon drivingly connected by a drive chain trained about said sprocket wheels and wherein said shafts are journalled from a housing enclosing said sprocket wheels and chain and including a downwardly facing lower housing wall generally paralleling a straight path extending between corresponding peripheral portions of said sprocket wheels and along which a reach of said chain extends, a transfer case chain slack adjustment structure, said structure including an elongated sleeve having one open end and a transverse mounting plate mounted on said open end of said sleeve and equipped with an opening formed therein registered with the sleeve open end, the other end of said sleeve being closed, said housing wall having an opening formed therein registered with a midportion of said chain reach, said mounting plate being mounted on the outer surface of said wall portion in position with said openings registered, an elongated shank member projecting through said openings and including a first end slidingly disposed in said sleeve and a second end disposed in said housing, said second end having a roller journalled therefrom for rotation about an axis extending transversely of said shank member and paralleling said shafts, means operably connected between said sleeve and shank member first end adjustably limiting longitudinal displacement of said first end of said shank member toward the closed other end of said sleeve, said roller being rollingly engaged with and inwardly deflecting the midportion of said chain reach, said sleeve and shank member including coacting means guiding said shank member from said sleeve against angular displacement of said shank member about its longitudinal axis relative to said sleeve, said other end of said sleeve having a threaded bore formed therethrough, said means operably connected between said sleeve and shank comprising a bolt threaded through said bore and having an inner end abuttingly engaged with the opposing end of said shank member.

* * * * *